Nov. 4, 1958
J. E. COTTLE
2,858,902
SOLVENT RECOVERY PROCESS
Filed Aug. 3, 1956
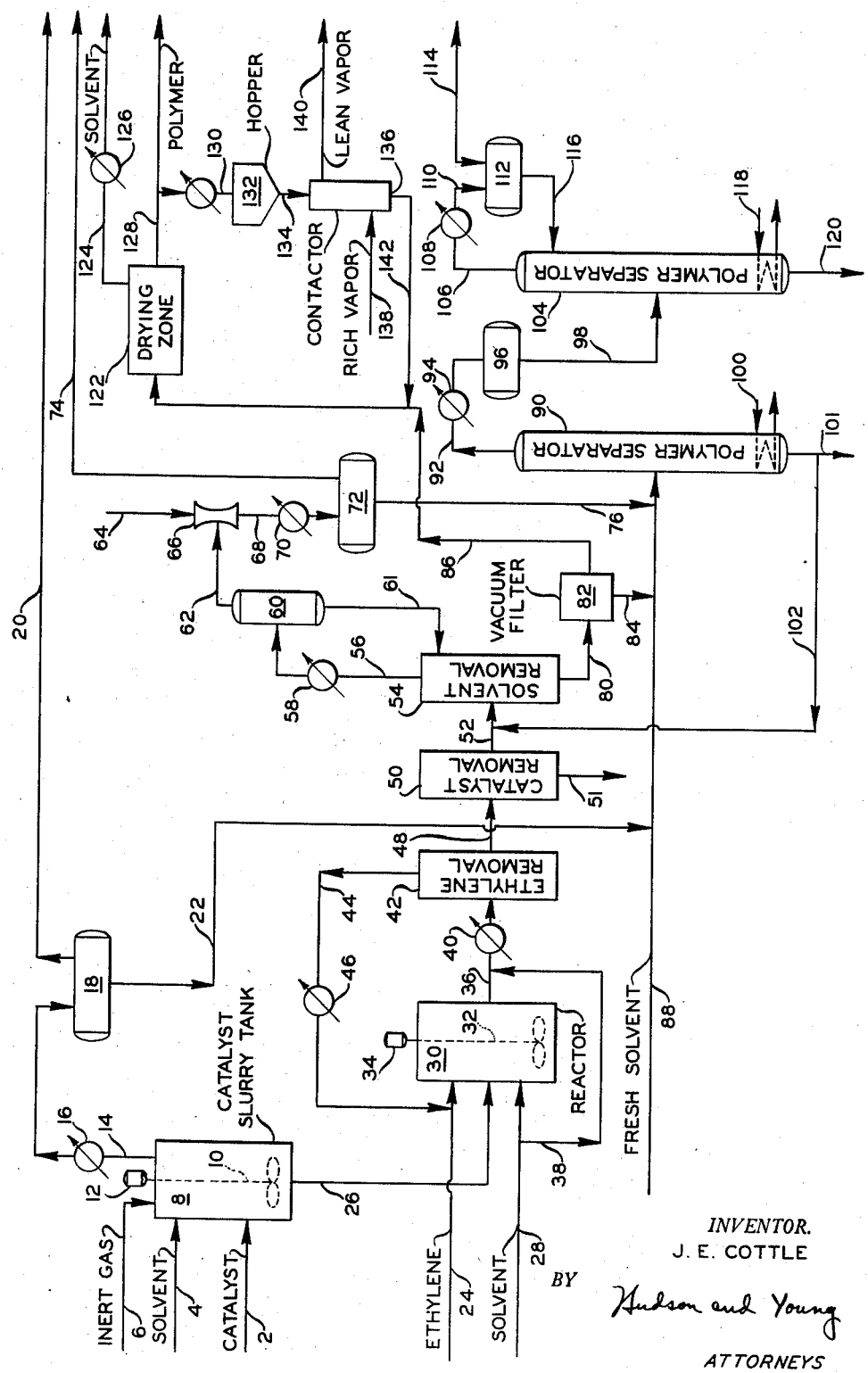
INVENTOR.
J. E. COTTLE
BY Hudson and Young
ATTORNEYS

2,858,902
SOLVENT RECOVERY PROCESS

John E. Cottle, Bartlesville, Okla., assignor to Phillips Petroleum Company, a corporation of Delaware Application August 3, 1956, Serial No. 601,874

14 Claims. (Cl. 183—114.2)

This invention relates to the sorption of hydrocarbons on solid olefin polymers. In one aspect it relates to the recovery of hydrocarbon solvent from a process stream by sorption with a novel sorbent.

In many processes both in the hydrocarbon and non-hydrocarbon field it is frequently necessary to vent gas streams containing hydrocarbon compounds. A typical example lies in the field of polymerization, such as the polymerization of olefins to solid polymers thereof. In one well known method olefin polymers are prepared by contacting an olefin with a catalyst in the presence of a solvent or diluent material. In the subsequent steps for the separation of catalyst and solvent, and the recovery of dry product polymer, a number of vent streams are formed which contain quantities of the solvent or diluent. Since the amount of solvent loss is an important economic factor in the polymerization process it is desirable to provide for a maximum recovery of this material.

It is an object of this invention to provide an improved process for recovering hydrocarbons from a gaseous mixture.

It is another object of this invention to provide an improved process for recovering solvent from vent streams in the polymerization of olefins to solid polymers thereof.

Still another object of the invention is to provide an improved process for recovering cycloalkanes, such as cyclohexane from a gaseous mixture.

These and other objects of the invention will become more readily apparent from the following detailed description and discussion.

The foregoing objects are achieved broadly by contacting a gaseous stream containing a hydrocarbon with a solid olefin polymer whereby the hydrocarbon is sorbed on the polymer. In a more specific aspect a gaseous stream containing a cycloalkane such as cyclohexane is contacted with an ethylene polymer having a specific gravity of at least 0.94 at 20° C. and preferably 0.96 or higher and a crystallinity of at least 70 percent and preferably at least 80 percent at ambient temperatures, whereby the cyclohexane is adsorbed on said ethylene polymer.

The process of this invention finds use generally in the treatment of hydrocarbons, however, it is particularly applicable when applied to the treatment of hydrocarbon materials like alkanes, including propane, normal butane, isobutane, normal pentane, isopentane, isooctane, etc., and preferably alkanes having five to twelve carbon atoms, and cycloalkanes such as cyclopentane, cyclohexane, methyl cyclohexane, and the like.

The olefin polymers suitable for use as sorbents including polymers or copolymers of mono-olefins such as ethylene, propylene, butylene, etc., also copolymers of mono-olefins and di-olefins such as butadiene, isoprene, etc.

The invention is particularly applicable to polymers of 1-olefins having a maximum of eight atoms per molecule and no branching nearer the double bond than the 4 position.

In a preferred embodiment the invention is directed to the use of sorbents comprising polymer materials prepared from ethylene which have a specific gravity at 20° C. of at least 0.94 and preferably 0.96 or higher and a crystallinity of at least 70 percent and preferably at least 80 percent at ambient temperatures. It has been found that the method of this invention is particularly effective when treating gases containing cycloalkanes, such as cyclohexane with the above ethylene polymers.

The olefin polymers suitable for use as sorbents are prepared by a number of methods. One method is described in detail in a copending application of Hogan and Banks, Serial No. 573,877, filed March 16, 1956. This particular method utilizes a chromium oxide catalyst, preferably containing hexavalent chromium, with silica, alumina, silica-alumina, zirconia, thoria, etc. In the method of the Hogan et al. application, olefins are polymerized in the presence of a hydrocarbon diluent, for example, an acyclic, alicyclic or aromatic compound which is inert and in which the formed polymer is soluble. The reaction is ordinarily carried out at a temperature between about 150° F. and about 450° F. and under a pressure sufficient to maintain the reactant and diluent in the liquid states. The polymers produced by this method, particularly the polymers of ethylene, are characterized by having an unsaturation which is principally either trans-internal or terminal vinyl, depending on the particular process conditions employed. When low reaction temperatures, about 150° F. to about 320° F., and a mobile catalyst are used for polymerization, the product polymer is predominantly terminal vinyl in structure. When polymerization is carried out at higher temperatures and in a fixed catalyst bed, the polymer has predominantly transinternal unsaturation. Polymers prepared by both methods are also characterized by their high densities and high percentage of crystallinity at ambient temperatures.

Other procedures which employ different catalysts are also used for preparing olefin polymers. For example, polymers are prepared in the presence of organometallic compounds such as triethyl aluminum plus titanium tetrachloride, mixtures of ethylaluminum halides with titanium tetrachloride, and the like. Another group of catalysts which is used comprises a halide of a Group IV metal such as, for example, titanium tetrachloride, silicon tetrabromide, zirconium tetrachloride, tin tetrabromide, etc., with one or more free metals selected from the group consisting of sodium, potassium, lithium, rubidium, zinc, cadmium and aluminum.

In carrying out the invention in one embodiment thereof a gaseous mixture containing the hydrocarbon to be sorbed is contacted in a suitable contacting vessel with a solid olefin polymer, such as a polymer of ethylene. The polymer can be present in a variety of shapes or forms, for example as a foam material, however, preferably it is subdivided to a small particle size, usually between about 1 and about 500 microns whereby a very large surface to volume ratio is provided. The required degree of subdivision can be obtained as an integral step of the polymerization process, that is by appropriately controlling the steps for recovering the polymer from the polymerization reaction effluent, or, if the polymer is obtained in a non-subdivided state, such as in sheets or other extruded forms, subdivision can be effected by grinding or by other suitable means.

It is believed that the process by which the solid polymer "takes up" the contacting hydrocarbon is a combination of absorption and adsorption. Since the primary action appears to be adsorption, however, the subsequent discussion will be directed to the application of this type of process; with the clear understanding that by so doing there is no intent to in any way limit the scope of the invention.

Although the contacting hydrocarbon is sorbed from a gas it should not be implied thereby that the sorbed material must be in the gaseous state. Thus, it is possible to sorb entrained droplets or particles of the hydrocarbon as well as hydrocarbon in the gaseous state.

A polymer particularly effective for adsorption is obtained by recovering polymer from the polymerization reaction by precipitation effected by controlled cooling. This process is described in detail in a copending application of R. A. Findlay, Serial No. 591,864, filed June 18, 1956. Briefly in this process the polymerization reaction product is cooled at a substantially constant rate whereby the polymer is precipitated in a uniform finely subdivided state.

Adsorption is preferably carried out at as low a temperature as possible, usually between about 50° F. and about 250° F. However, since the adsorption process generally comprises adsorbing the hydrocarbon material while in the vapor state, higher temperatures are necessary for the recovery of higher boiling materials. The adsorption process can be carried in a fixed or moving bed and in a fluid or non-fluid system. The amount of hydrocarbon absorbed by the polymer depends on a number of factors including the material to be adsorbed, the particular polymer employed, the adsorption temperature, and the degree of approach to adsorption equilibrium. Usually, under preferred conditions of operation, the amount of hydrocarbon adsorbed is between about 1 and about 10 percent by weight of the polymer adsorbent. As previously stated, one factor in determining the amount of hydrocarbon which can be adsorbed depends on the degree of approach to adsorption equilibrium. This in turn is a function of the quantity of adsorbent employed relative to the material to be adsorbed and also the time of contact between the gas and the adsorbent. Usually, it is desirable to provide contact between the hydrocarbon containing gas and adsorbent in a ratio of between about 0.01 pound of hydrocarbon and about 0.1 pound of hydrocarbon per hour per pound of adsorbent. The contact time is generally maintained between about 0.5 hour and about 15 hours.

The gaseous materials treated within the scope of this invention can contain a variety of compounds other than the hydrocarbon or hydrocarbons to be adsorbed. Examples of the gases which can be present are nitrogen, steam or water vapor, carbon monoxide, carbon dioxide, hydrogen, etc. Inasmuch as heavier hydrocarbons are preferentially adsorbed, the gaseous mixture can also contain lighter hydrocarbons, such as methane, ethane, ethylene, etc., which will remain substantially unadsorbed.

The adsorbed hydrocarbon can be recovered by subjecting the adsorbent to heat or by contacting the adsorbent, preferably at an elevated temperature with a suitable purging gas such as nitrogen, methane, carbon dioxide, ethane, or other low molecular weight normally gaseous material.

The process of this invention is generally applicable for the adsorption of hydrocarbons from gaseous mixtures immaterial of the source of the mixtures. Thus, the invention finds use in petroleum processes such as cracking, reforming, desulfurization, hydrogenation, dehydrogenation, etc., and processes such as alkylation, ammonia synthesis, gas synthesis, etc. The invention is particularly advantageous in processes which make use of a hydrocarbon compound in large quantities, for example, as a diluent or solvent. A typical process wherein this occurs is the polymerization of olefins to solid polymers thereof. Adsorption in the method of this invention is particularly advantageous when carried out in conjunction with a polymerization process which provides as a product a polymer of the type suitable as an adsorbent. For purposes of clarity the following discussion is directed to the adsorption of hydrocarbons from process gases formed in the polymerization of olefins to solid polymers. This application, while it constitutes a preferred embodiment of the invention, is merely illustrative thereof and is not intended in any way to limit the scope of the invention.

The polymerization of olefins to solid polymers thereof can be carried out by contacting the olefin to be polymerized with a catalyst in the presence of a solvent or diluent at an elevated temperature and pressure. A number of catalysts may be used for this purpose, including chromium oxide, preferably containing hexavalent chromium, with silica, alumina, zirconia, thoria, silica-alumina, etc. Various organometallic compounds, such as triethylaluminum plus titanium tetrachloride, mixtures of ethylaluminum halides with titanium tetrachloride, and the like, may also be used. Still another group of catalysts which find use in the preparation of olefin polymers comprise a halide of a group IV metal, such as for example, titanium tetrachloride, silicon tetrabromide, zirconium tetrachloride, tin tetrabromide, etc., with one or more free metals selected from the group consisting of sodium, potassium, lithium, rubidium, zinc, cadmium and aluminum.

The polymers which can be prepared by this process include a wide variety of materials such as, for example: polymers or copolymers of monoolefins, like ethylene, propylene, butylene, etc., also copolymers of monoolefins and diolefins such as butadiene, isoprene, etc.

The temperature required for polymerizing olefins varies over a wide range. However, usually it is preferred to carry out the reaction at a temperature between about 150° F. and about 450° F. The particular temperature to be employed in each individual case depends on the catalyst used, the olefin to be polymerized and the operating conditions employed, such as pressure, space velocity, diluent to olefin ratio, etc.

The polymerization pressure is often maintained at a sufficient level to assure a liquid phase reaction, that is at least about 100 to 300 p. s. i. g., depending upon the type of feed material and the polymerization temperature. Higher pressures up to 500 to 700 p. s. i. g. or higher can be used, if desired. When operating with a fixed bed the space velocity varies from as low as about 0.1 to about 20 volumes of feed per volume of catalyst, with the preferred range being between about 1 and about 6 volumes per volume. It is generally preferred to maintain a residence time between about 15 minutes and about 12 hours. The polymerization process can also be carried out in the presence of a mobile catalyst. In this type of operation the catalyst concentration in the reaction zone is maintained between about 0.01 and about 10.0 percent by weight.

The use of a diluent in the polymerization reaction in general serves two purposes. Since the reactions are usually exothermic in nature, the presence of a quantity of diluent provides a method for obtaining close control of the reaction temperature. In addition, polymers formed in the reaction or a portion thereof may be tacky in nature and, if this is the case, the presence of a diluent tends to prevent adherence of the polymer to the walls of the reaction vessel and the recovery equipment which is used in treating the effluent from the polymerization reaction. In general, the quantity of diluent is large relative to the olefin feed material. Usually, the olefin constitutes between about 0.1 and about 25 percent by volume of the mixture and preferably between about 2 and about 15 percent by volume.

The solvent or diluent employed in the polymerization reaction includes in general, paraffins which dissolve the polymers at the temperature employed in the reaction zone. Among the more useful solvents are alkanes having between about 3 and about 12 carbon atoms per molecule, such as, for example, propane, isobutane, n-pentane, isopentane, isooctane, etc., and preferably those alkanes having 5 to 12 carbon atoms per molecule. Also useful in the polymerization reaction are alicyclic hydrocarbons, such as cyclohexane, methylcyclohexane, etc. Aromatic diluents can be used, however, in some instances they (or impurities therein) tend to shorten the catalyst life, therefore, their use depends on the importance of catalyst life. All of the foregoing and in addition, other hydrocarbon diluents which are relatively inert and in the liquid state at the reaction conditions may also be employed in carrying out the reaction of olefins to form solid polymers.

The following example is presented in illustration of a preferred embodiment of the invention:

Example I

Ethylene was polymerized in a continuous process in a 20 gallon reactor in the presence of a chromium oxide, silica aluminum catalyst containing 2.5 weight percent total chromium and 2.2 percent hexavalent chromium. Prior to the reaction, the catalyst was activated in air by subjecting it to gradually increasing temperature up to 950° F. The operating conditions under which the polymer was formed were as follows:

| | |
|---|---|
| Ethylene feed rate _____ lb./hr __ | 10.7 |
| Cyclohexane feed rate _____ lb./hr __ | 61 |
| Polymer concentration in reactor ____ wt. percent __ | 9.4 |
| Catalyst concentration in reactor[1] ____ wt. percent __ | 1.09 |
| Pressure _____ p. s. i. g __ | 420 |
| Temperature _____ ° F __ | 275 |

[1] On a solvent free basis.

The reactor effluent was processed to remove the catalyst and unreacted ethylene after which the polymer was precipitated from solution and dried.

The equilibrium between cyclohexane vapor and ethylene polymer at 240° F. and 1 atmosphere was measured to determine the amount of vapor which could be sorbed. The solid-vapor equilibrium was determined by a volumetric method: Two steel bombs and a mercury manometer were manifolded together and placed in a 240° F. oil bath. The apparatus was constructed so that one bomb containing dry ethylene polymer was evacuated while the other bomb was flushed out with cyclohexane vapor. By means of a valve the cyclohexane vapor was allowed to pass into the evacuated bomb while mercury was added to the vapor filled bomb to keep the pressure on the system constant at 1 atmosphere. It was found in three tests that the ethylene polymer sorbed cyclohexane in the amounts of 2.81, 2.72, and 2.74 weight percent over time periods of 5 to 6 hours. Approaching equilibrium from the other direction, that is with ethylene polymer saturated with cyclohexane (50 percent or more), equilibrium values of 3.65 and 3.62 weight percent cyclohexane were obtained. The true equilibrium value, therefore, lies between the values given above.

Tests were also carried out to determine the feasibility of removing sorbed vapor with a nitrogen purge. In testing out this procedure a U-tube was filled with ethylene polymer and cyclohexane vapors were allowed to pass through the U-tube for 10 to 15 minutes at 240° F. The U-tube was then placed in a 240° F. oil bath and nitrogen was passed through the tubes at controlled rates for periods of 1 to 4 minutes. The samples were then weighed and placed in an oven for 15 hours at 230° F. The loss in weight of the samples was the amount of cyclohexane still remaining after purging. The results of several experiments are reported in the following table:

| Sample No. | Nitrogen Rate (ft.³/Min./# ethylene polymer) | Purge Time (Min.) | Wt. Percent C₇C₆ On Polymer After Purge |
|---|---|---|---|
| 1 | 0.197 | 1 | 0.280 |
| 2 | 0.230 | 2 | 0.098 |
| 3 | 0.245 | 3 | 0.088 |
| 4 | 0.520 | 1 | 0.158 |
| 5 | 0.545 | 2 | 0.0635 |
| 6 | [1] 0.550 | 2 | 0.058 |
| 7 | 0.505 | 3 | 0.0450 |
| 8 | 0.486 | 4 | 0.028 |
| 9 | 0.671 | 1 | 0.0814 |

[1] In this test, a sample of saturated ethylene polymer was dried with superheated cyclohexane and then purged with nitrogen.

In order to more clearly define the invention and provide a better understanding thereof, reference is had to the accompanying drawing which is a diagrammatic illustration of a polymerization process embodying a contactor containing ethylene polymer for use as an adsorbent in the manner of this invention.

Referring to the drawing, cyclohexane solvent and chromium oxide catalyst containing hexavalent chromium are introduced to catalyst slurry tank 8 through conduits 4 and 2 respectively. To prevent the introduction of moisture an inert gas atmosphere is maintained in the slurry tank by the introduction of nitrogen gas under superatmospheric pressure through conduit 6. A mixer 10, driven by a motor 12, is provided for maintaining turbulence and adequately mixing the catalyst and solvent in the catalyst slurry tank. It is desirable that the catalyst slurry be introduced to the polymerization reactor at an elevated temperature approximately equal to the polymerization reaction temperature. Preferably heat is supplied during the formation of the catalyst slurry by introducing heat to the slurry tank, such as by indirect heat exchange. Any suitable apparatus can be provided for this purpose, such as for example, a double walled slurry tank, heat exchange coils disposed in said tank, etc. In this specific illustration the slurry tank is provided with double walls, a heated fluid being passed between the inner and outer walls (not shown).

A mixture of vaporized cyclohexane and nitrogen is released from the slurry tank through conduit 14, passes through condenser 16 wherein a portion of the cyclohexane is condensed and enters an accumulator 18. Gases from the accumulator are discharged overhead through conduit 20 and the liquid therein is withdrawn through conduit 22 and combined with fresh solvent directed to the polymer separator 90.

The catalyst slurry is removed from the slurry tank through conduit 26 and introduced to polymerization reactor 30. This material is joined in the reactor by ethylene and additional cyclohexane, introduced through conduits 24 and 28 respectively. Within the reactor polymerization is effected at a temperature at about 285° F. and at a pressure at about 500 p. s. i. a. whereby a major portion of the ethylene is converted to solid polymers. A mixer 32, driven by motor 34, is provided for maintaining distribution of the catalyst throughout the polymerization reactor. Effluent from the reactor comprising polymer, catalyst, cyclohexane and unreacted ethylene is combined with additional solvent through conduit 38 and passed through heater 40 wherein the temperature is increased to assure dissolution of all of the polymer in the solvent material. Following this, the mixture enters an ethylene removal zone 42 wherein a mixture of ethylene and cyclohexane is separated and recycled to the reactor through conduit 44 and cooler 46. The remaining effluent is introduced to a catalyst removal zone 50 through conduit 48 wherein catalyst is separated by suitable means such as filtration or centrifugation. The catalyst is removed through conduit 51 and the remaining effluent now essentially polymer in solution is passed through conduit 52 to a solvent removal zone 54. In this zone a major portion of the solvent is removed from the polymer solution. Several methods can be used for effecting solvent removal including controlled cooling, water agglomeration, flash vaporization, etc. all of which effect precipitation of the polymer from solution. In this specific example, controlled cooling, provided by autorefrigeration, is used to precipitate the polymer. In carrying out this operation a reduction in pressure on the solvent removal zone 54 is provided by a suitable vacuum means such as steam ejector 66 whereby solvent is vaporized from zone 54, thus cooling this zone and causing precipitation of the polymer from solution. Vaporized cyclohexane passes overhead through conduit 56 and condenser 58 and enters accumulator 60. Condensed solvent is recycled to the solvent removal zone through conduit 61 to replace vaporized material. The gases from accumulator 60 comprising cyclohexane, ethylene, and water vapor are introduced to ejector 66 through conduit 62. These gases are entrained in steam from conduit 64, passed through conduit 68 and condenser 70 into a second accumulator 72. Vapor, comprising ethylene, water and cyclohexane, is withdrawn from accumulator 72 through conduit 74 and the condensed material contained therein is combined through conduit 76 with fresh solvent directed to polymer separator 90. The precipitated polymer formed in the solvent removal zone 54 is present as a slurry in cyclohexane and is removed from said zone through conduit 80 and passed through a filter 82 wherein a major portion of the solvent is removed. The filtrate is combined through conduit 84 with fresh solvent directed to the polymer separator 90. The filtered polymer, still wet with cyclohexane, is passed through conduit 86 to drying zone 122 wherein removal of the remaining solvent is effected. The drying zone can be any apparatus suitable for this use, such as a belt conveyor dryer, a steam drum dryer, etc. The solvent removed in the drying zone is condensed in a condenser 126 and recycled through conduit 124 for reuse in the preceding process as desired. The dry polymer is divided, with a portion being passed through conduit 128 as a product of the process and the remainder passed through conduit 130 to a feed hopper 132 from which it is introduced through conduit 134 to contactor 136. Within the contactor the polymer is passed counter-current to ascending vapor containing cyclohexane, said vapor being introduced at the bottom of the contactor through conduit 138 and withdrawn from the upper portion thereof through conduit 140. During its passage through the contactor the vapor loses cyclohexane to the polymer by adsorption and the stream leaving through conduit 140 is substantially free of solvent. The polymer containing adsorbed cyclohexane is conveniently recycled to the drying zone through conduit 142.

The vapor introduced to contactor 136 can comprise any one of the several vapor streams discussed during the description of the drawing. For example, the vapor stream can comprise a mixture of nitrogen and cyclohexane from accumulator 18; it can comprise a mixture of ethylene, water and cyclohexane obtained from accumulator 72; or it can comprise a mixture of ethylene, cyclohexane and water obtained from accumulator 112, or a combination of these streams.

The gas obtained from accumulator 112 results from the treatment of fresh solvent and various recovered solvent streams, for the separation of polymer and water therefrom. In carrying out the solvent rerun operation, fresh solvent, introduced through conduit 88, is joined by solvent streams from accumulator 18, vacuum filter 82 and from accumulator 72. The total solvent is introduced to polymer separator 90 wherein separation of polymer is provided by vaporizing and distilling overhead solvent and lighter material. The heat required for this purpose is provided by a conventional reboiler 100. Separated polymer is withdrawn and either discarded through conduit 101 or recycled to solvent removal zone 54 through conduit 102. The vaporized material passes overhead through conduit 92, condenser 94 and enters accumulator 96. This material is then introduced to solvent separator 104 through conduit 98 wherein a separation is effected between the solvent and various low-boiling impurities such as water. The heat required for this separation is provided by a reboiler 118. Substantially pure solvent is withdrawn as liquid from the solvent separator through conduit 120 and is distributed to various parts of the polymerization unit, as required. The gaseous product from separator 104 passes overhead through conduit 106, condenser 108 and enters accumulator 112 via conduit 110. The liquid portion is recycled to the separator as reflux and the uncondensed material, comprising ethylene, cyclohexane and water is vented from the accumulator through conduit 114.

The following example is provided to illustrate a typical application of a preferred embodiment of the invention on a commercial scale.

*Example II*

Flows:
  Dry polymer (130) _____lb./hr__ 1248
  Rich vapor (138) _____lb./hr__ 138
    Composition:
      Ethylene _____wt. percent__ 72.4
      Water _____wt. percent__ 3.6
      Cyclohexane _____wt. percent__ 24.0
  Lean vapor (140) _____ 106
    Composition:
      Ethylene _____wt. percent__ 94.3
      Water _____wt. percent__ 3.8
      Cyclohexane _____wt. percent__ 1.9
  Wet polymers (142) _____ 1280

The dry polymer was obtained by polymerizing ethylene in the presence of the same type of catalyst and under the same reaction conditions as in Example I. The polymer was obtained in a size range of between about 1 and about 500 microns by controlled precipitation at a constant rate of temperature decrease.

Having thus described the invention by providing specific examples thereof, it is to be understood that no undue limitations or restrictions are to be implied by reason thereof and that many variations and modifications are clearly within the scope of the invention.

I claim:

1. A method for sorbing a hydrocarbon selected from the group consisting of alkanes containing 3 to 12 carbon atoms and cycloalkanes containing 3 to 12 carbon atoms which comprises contacting said hydrocarbon with a solid olefin polymer selected from the group consisting of polymers and copolymers of 1-olefins having a maximum of 8 carbon atoms per molecule and no branching nearer the double bond than the 4 position and copolymers of said 1-olefins and di-olefins selected from the group consisting of butadiene and isoprene, prepared by contacting an olefin feed material under suitable conversion conditions with a catalyst comprising chromium oxide, containing hexavalent chromium, associated with a carrier material selected from the group consisting of silica, alumina, thoria, zirconia and composites thereof.

2. A method for sorbing a hydrocarbon selected from the group consisting of alkanes containing 3 to 12 carbon atoms and cycloalkanes containing 3 to 12 carbon atoms which comprises contacting said hydrocarbon with a solid olefin polymer selected from the group consisting of polymers and copolymers of 1-olefins having a maximum of 8 carbon atoms per molecule and no branching nearer the double bond than the 4 position and copolymers of said 1-olefins and di-olefins selected from the group consisting of butadiene and isoprene, prepared by contacting an olefin feed material under suitable conversion conditions with a catalyst comprising chromium oxide, containing hexavalent chromium, associated with a carrier material selected from the group consisting of silica, alumina, thoria, zirconia and composites thereof and recovering the sorbed hydrocarbon from said polymer by desorption.

3. The process of claim 2 in which the hydrocarbon is desorbed by heating the solid olefin polymer.

4. The process of claim 2 in which the hydrocarbon is desorbed by contacting the solid olefin polymer with a low molecular weight gas.

5. A method for adsorbing a cycloalkane containing 3 to 12 carbon atoms in the gaseous state which comprises contacting said cycloalkane with a solid olefin polymer selected from the group consisting of polymers and copolymers of 1-olefins having a maximum of 8 carbon atoms per molecule and no branching nearer the double bond than the 4-position and copolymers of said 1-olefins and diolefins selected from the group consisting of butadiene and isoprene prepared by contacting an olefin feed material under suitable conversion conditions with a catalyst comprising chromium oxide, containing hexavalent chromium, associated with a carrier material selected from the group consisting of silica, alumina, thoria, zirconia and composites thereof.

6. A method for adsorbing a cycloalkane containing 3 to 12 carbon atoms in the gaseous state which comprises contacting said cycloalkane with a solid polymer of a 1-olefin having a maximum of eight carbon atoms per molecule and no branching nearer the double bond than the 4-position, prepared by contacting an olefin feed material under suitable conversion conditions with a catalyst comprising chromium oxide, containing hexavalent chromium, associated with a carrier material selected from the group consisting of silica, alumina, thoria, zirconia and composites thereof.

7. A method for adsorbing a hydrocarbon in the gaseous state selected from the group consisting of alkanes containing three to twelve carbon atoms and cycloalkanes containing 3 to 12 carbon atoms which comprises contacting said hydrocarbon with a solid ethylene polymer having a density of at least 0.94 and a crystallinity of at least 70 percent at ambient temperatures.

8. A method for adsorbing a cycloalkane containing from 3 to 12 carbon atoms in the gaseous state which comprises contacting said cycloalkane with a solid ethylene polymer having a density of at least 0.94 and a crystallinity of at least 70 percent at ambient temperatures.

9. A method for adsorbing cyclohexane in the gaseous state which comprises contacting the cyclohexane with a solid ethylene polymer having a density of at least 0.94 and a crystallinity of at least 70 percent at ambient temperatures.

10. A method for adsorbing a hydrocarbon selected from the group consisting of alkanes containing from three to twelve carbon atoms and cycloalkanes containing from 3 to 12 carbon atoms which comprises contacting said hydrocarbon with a solid olefin polymer selected from the group consisting of polymers and copolymers of 1-olefins having a maximum of 8 carbon atoms per molecule and no branching nearer the double bond than the 4-position and copolymers of said 1-olefins and diolefins selected from the group consisting of butadiene and isoprene, prepared by contacting an olefin feed material under suitable conversion conditions with a polymerization catalyst.

11. A method for adsorbing a cycloalkane containing from 3 to 12 carbon atoms in the gaseous state which comprises contacting said cycloalkane with a solid olefin polymer selected from the group consisting of polymers and copolymers of 1-olefins having a maximum of 8 carbon atoms per molecule and no branching nearer the double bond than the 4-position and copolymers of said 1-olefins and diolefins selected from the group consisting of butadiene and isoprene, prepared by contacting an olefin feed material under suitable conversion conditions with a polymerization catalyst.

12. A method for adsorbing a hydrocarbon selected from the group consisting of alkanes containing 3 to 12 carbon atoms and cycloalkanes containing 3 to 12 carbon atoms from a gaseous mixture containing one or more gases selected from the group consisting of nitrogen, steam, water vapor, carbon monoxide, carbon dioxide, and lower boiling hydrocarbons selected from the group consisting of methane, ethane and ethylene, which comprises contacting said gaseous mixture with a solid olefin polymer selected from the group consisting of polymers and copolymers of 1-olefins having a maximum of 8 carbon atoms per molecule and no branching nearer the double bond than the 4-position and copolymers of said 1-olefins and diolefins selected from the group consisting of butadiene and isoprene, prepared by contacting an olefin feed material under suitable conversion conditions with a catalyst comprising chromium oxide, containing hexavalent chromium, associated with a carrier material selected from the group consisting of silica, alumina, thoria, zirconia and composites thereof.

13. A method for adsorbing a hydrocarbon selected from the group consisting of alkanes containing 3 to 12 carbon atoms and cycloalkanes containing 3 to 12 carbon atoms from a gaseous mixture containing one or more gases selected from the group consisting of nitrogen, steam, water vapor, carbon monoxide, carbon dioxide, and lower boiling hydrocarbons selected from the group consisting of methane, ethane and ethylene which comprises contacting said hydrocarbon with a solid olefin polymer, selected from the group consisting of polymers and copolymers of 1-olefins having a maximum of 8 carbon atoms per molecule and no branching nearer the double bond than the 4-position and copolymers of said 1-olefins and diolefins such as butadiene and isoprene, prepared by contacting an olefin feed material under siutable conversion conditions with a catalyst comprising chromium oxide, containing hexavalent chromium, associated with a carrier material selected from the group consisting of silica, alumina, thoria, zirconia and composites thereof.

14. The process of claim 13 in which the cycloalkane is cyclohexane.

References Cited in the file of this patent

UNITED STATES PATENTS 2,726,231  Field et al. _____ Dec. 6, 1955